(12) United States Patent
Jolley

(10) Patent No.: US 7,098,403 B2
(45) Date of Patent: Aug. 29, 2006

(54) OUTLET COVER ASSEMBLY

(76) Inventor: Mark Jolley, 3593 Bluff Ct., Carlsbad, CA (US) 92008

( * ) Notice: Subject to any disclaimer, the term of this patent is extended or adjusted under 35 U.S.C. 154(b) by 0 days.

(21) Appl. No.: 10/800,419

(22) Filed: Mar. 12, 2004

(65) Prior Publication Data

US 2004/0256134 A1    Dec. 23, 2004

Related U.S. Application Data

(60) Provisional application No. 60/454,250, filed on Mar. 12, 2003.

(51) Int. Cl.
*H05K 3/03* (2006.01)
*H01R 13/44* (2006.01)

(52) U.S. Cl. .......................... 174/67; 174/66; 220/241; 220/242; 439/135; 439/149

(58) Field of Classification Search ................ 174/67, 174/66, 53, 58, 57; 220/241, 242, 3.2, 3.8; 439/135, 195, 137, 145, 136, 133, 139, 149; D13/156, 177
See application file for complete search history.

(56) References Cited

U.S. PATENT DOCUMENTS

| | | | |
|---|---|---|---|
| 2,988,242 A * | 6/1961 | Kneip | ......................... 220/242 |
| 3,068,442 A | 12/1962 | Kubik et al. | |
| 3,865,456 A * | 2/1975 | Dola | ........................... 439/137 |
| 4,640,564 A * | 2/1987 | Hill | ............................. 439/137 |
| 4,737,599 A | 4/1988 | Fontaine | |
| 4,774,384 A | 9/1988 | Gregory | |
| 4,793,818 A | 12/1988 | Poirier | |
| 4,810,833 A | 3/1989 | Meyers | |
| 4,857,004 A | 8/1989 | Poirier | |
| 4,952,755 A * | 8/1990 | Engel et al. | .................. 174/67 |
| 5,026,299 A | 6/1991 | Foulk | |
| 5,240,426 A * | 8/1993 | Barla | ......................... 439/136 |
| 5,288,945 A | 2/1994 | Bruce | |
| 5,563,373 A | 10/1996 | Doroslovac | |
| 5,727,958 A | 3/1998 | Chen | |
| 5,934,919 A | 8/1999 | Cross et al. | |
| 5,998,735 A * | 12/1999 | Patterson, Jr. | .............. 220/242 |
| 6,222,125 B1 * | 4/2001 | Shoemaker | .................. 174/67 |
| 6,342,676 B1 | 1/2002 | Ha | |
| 6,372,987 B1 | 4/2002 | Ha | |
| 6,545,218 B1 * | 4/2003 | Blaess | ......................... 174/67 |
| 6,794,575 B1 * | 9/2004 | McBain et al. | ............... 174/67 |

* cited by examiner

*Primary Examiner*—Angel R. Estrada
(74) *Attorney, Agent, or Firm*—Fitch, Even, Tabin & Flannery

(57) ABSTRACT

A cover for a socket of an electrical outlet is provided for selectively blocking access to the electrical outlet unless a two separate motions are performed. The two motions include disengaging a locking mechanism and shifting the door to an open position. The two motions are selected to the difficult for a typical infant or young child to perform in order to substantially prevent an infant or a young child from gaining access to the socket positioned behind the cover for electrical outlet.

15 Claims, 2 Drawing Sheets

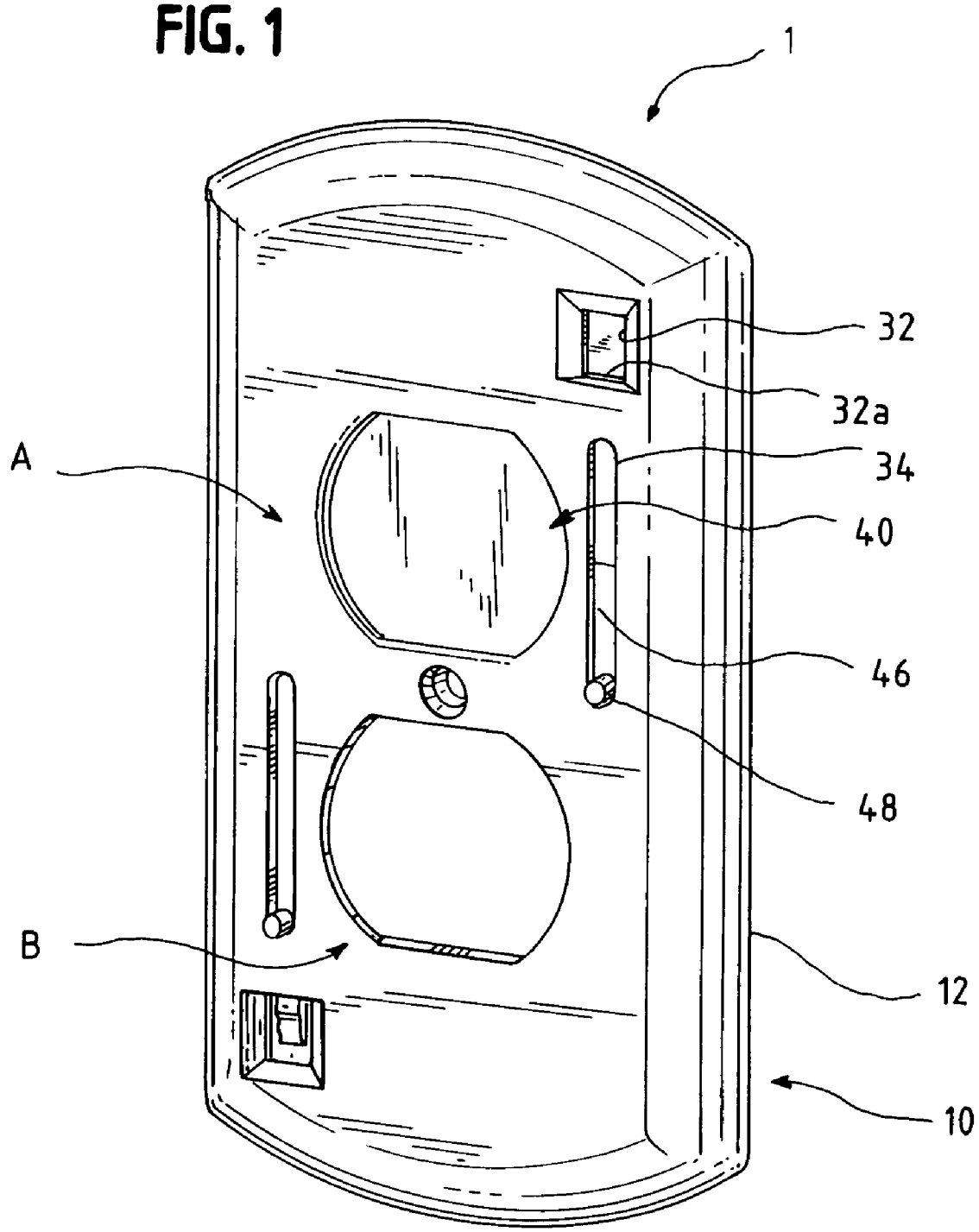

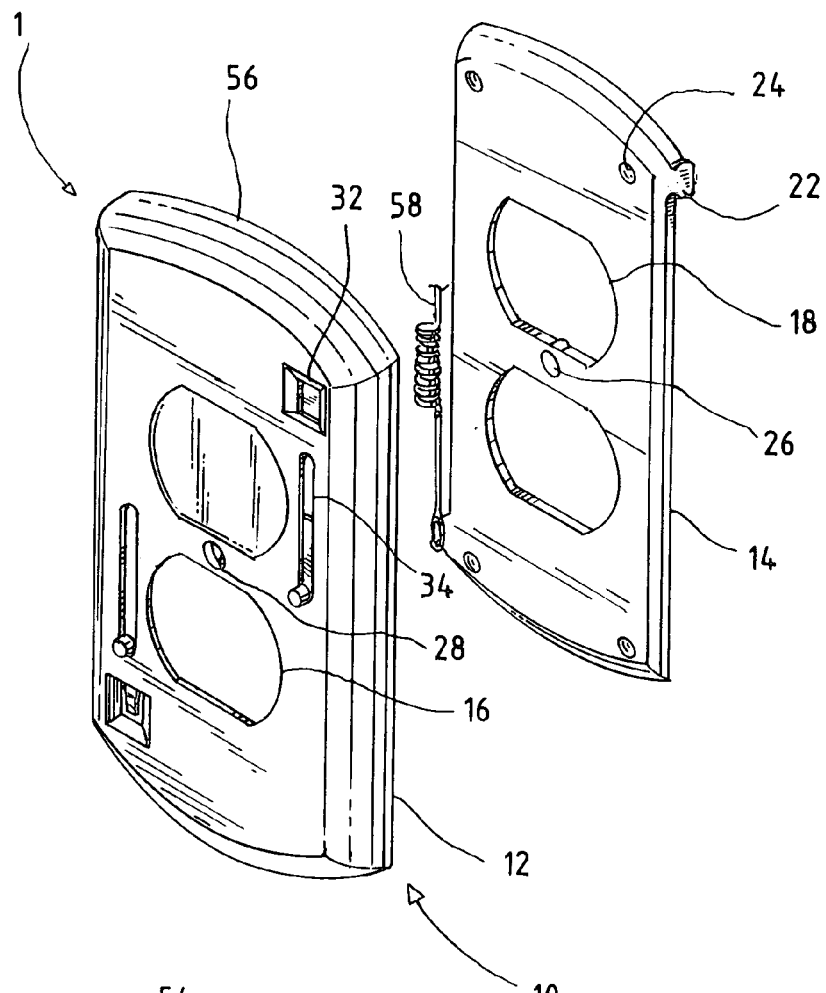
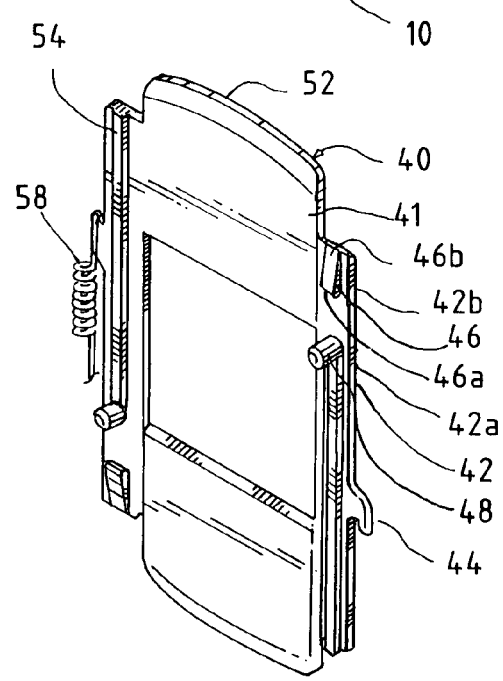

OUTLET COVER ASSEMBLY

This application claims the benefit of 60/454,250, filed Mar. 12, 2003.

FIELD

An outlet cover assembly for an electrical outlet having a socket, and in particular an outlet cover assembly for an electrical outlet for substantially preventing unintentional access to a socket by an infant or small child.

BACKGROUND

Electrical outlets are a potential source of danger in a household or building where infants or small children are present. An infant or small child may be tempted or may inadvertently insert a small object or a digit into the socket of an electrical outlet. The infant or small child may receive an electrical shock. The electrical shock may scare the infant or child, or more seriously may cause physical harm.

To prevent access to an electrical outlet by an infant or small child, plastic plugs have been developed for insertion into the sockets. The plugs may be removed, such as by an adult, when access to the electrical socket is desired. However, such plugs may also be removed by a child. Further, once removed, the plug may inadvertently not be reinserted into the socket.

SUMMARY

A cover for a socket of an electrical outlet is provided for selectively blocking access to the electrical outlet unless two separate motions are performed. The two motions are selected to be difficult for an infant or young child to perform in order to substantially prevent an infant or young child from gaining access to the socket positioned behind the cover for the electrical outlet. The two separate motions may require the use of two separate hands.

The cover for a socket of an electrical outlet may include a substantially planar frame having an opening generally aligned with the socket of the electrical outlet. A door may be provided that is shiftable between a blocking position generally blocking access to the opening and an open position generally permitting access to the socket disposed behind the opening. A locking mechanism may be provided that is operably connected to the door. The locking mechanism may be movable between a locking position substantially preventing shifting of the door from the blocking position to the open position and an unlocking position permitting shifting of the door from the blocking position to the open position.

An actuator element of the locking mechanism may also be provided and may be movable in a shifting direction for movement of the locking mechanism from the locking position to the unlocking position, the shifting direction being generally perpendicular to the plane of the frame. A translation element of the locking mechanism may be provided and movable in a translation direction for shifting of the door from the blocking position to the unblocking position, the translation direction being generally parallel to the plane of the frame.

A cover for a socket of an electrical outlet may include a locking element of the locking mechanism engageable with a locking feature of the frame. When the locking element engages the locking feature of the frame, shifting of the door from the blocking position to the open position is substantially prevented. The locking element may be biased into engagement with the locking feature by a biasing element. The biasing element may comprise an arm having an end attached to the door and another end having the locking element attached thereto. The arm may be integrally formed with the door, and the locking element may be integrally formed with the arm. The locking feature may comprise a portion of the frame surround an aperture formed in the frame.

A spring member may be provided to bias the door toward the blocking position. The spring member may have a portion attached to the door and another portion attached to the frame. The spring member may be attached to the door through a loop or hook engageable with a protrusion formed on the door. Likewise, the other end of the spring member may comprise a hook or loop that is engageable with a protrusion formed on the frame.

The frame may include a side facing away from electrical outlet and a side facing toward the electrical outlet. The frame may have a slot positioned between the sides. The translation element may be accessible through the slot and movable in the translation direction to shift the door between the blocking position and the open position. The translation element may be attached to the arm.

The frame may comprise an outer plate facing away from the electrical outlet and a blocking plate positioned facing the electrical outlet. The door may be positioned between the outer plate and the backing plate. The arm may have a thicker region proximate the translation element to substantially prevent movement of the translation element in the shifting direction and a thinner region proximate the locking element to permit movement of the locking element in the shifting direction.

A cover for the socket of an electrical outlet may be provided having at least one opening generally aligned with the socket of the electrical outlet. At least one door shiftable between a blocking position generally blocking access to the opening and an open position generally permitting access to the opening may also be provided. Locking means movable between a locking position substantially preventing shifting of the door from the blocking position to the open position and an unlocking position permitting shifting of the door from the blocking position to the open position may be provided. Actuator means may also be provided, movable in a shifting direction to move the locking means from the locking position to the unlocking position. Translation means may also be provided movable in a translation direction to shift the door from the blocking position to the unblocking position.

A cover may be provided for a socket of an electrical outlet. The cover includes a frame having an open position to be alignable with the socket of the electrical outlet. A door may be provided shiftable between a blocking position generally blocking access to the opening and an open position generally permitting access to the opening. A locking mechanism may be operably connected to the door. The locking mechanism may be movable between a locking position substantially preventing shifting of the door from the blocking position to the open position, and an unlocking position permitting shifting of the door from the blocking position to the open position. The movement of the locking mechanism from the locking position to the unlocking position may require disengagement of a locking element of the locking mechanism from a locking feature while generally simultaneously requiring translation of a translation element operably connected to the door to shift the door from the blocking position to the open position.

BRIEF DESCRIPTION OF THE DRAWINGS

FIG. 1 is a perspective view of an outlet cover illustrating a door in an open position and a door in a blocking position;

FIG. 2 is a perspective view of the outlet cover of FIG. 1 illustrating a backing plate separated from a front plate; and FIG. 3 is a perspective view of the doors of FIG. 1.

DETAILED DESCRIPTION OF THE DRAWINGS

The outlet cover assembly 1 includes a frame 10 having openings 16 and 18 therethrough. The openings 16 and 18 are positioned to be alignable with sockets of an electrical outlet. A pair of doors 40 are movable between blocking positions A and open positions B upon movement of a locking mechanism from a locking position to an unlocking position. When the door 40 is in the closed or blocking position A and the locking mechanism is in the locking position movement of the door 40 to the open position B is substantially prevented. In order to move the door 40 from the blocking position A to the open position B, the locking mechanism must be moved to the unlocking position. Movement of the locking mechanism from an unlocking position to the locking position and shifting of the door 40 requires two separate movements. The two separate movements are a shifting movement to unlock the locking mechanism and a translation movement to shift the door 40 to the open position A. The two separate movements are selected to be difficult for an infant or small child to perform, thereby substantially preventing an infant or small child from moving the door 40 from the blocking position A to the open position B.

The two movements selected preferably require motor skills that are more complicated than those often capable of being performed by an infant or small child. More particularly, there are several basic categories of hand manipulation skills, such as translation and shifting. Translation is a linear movement, such as from the palm to the fingers or fingers to palm. Shifting is a linear movement in a different direction than translation, such as between or among fingers.

Further, the two separate movements are preferably selected to require use of two different hands, which may be difficult for a typical infant or small child. For example, a child may initially use upper extremities in patterns that are not coordinated. Movement of one arm or hand often elicits reflexive, non-purposeful reactions in the other one. Thus, the use of two separate motion, preferably requiring two separate hands, further contributes to substantially preventing an infant or small child from shifting the doors 40 of the outlet cover assembly 1 from the blocking position A to the open position B exposing the sockets of an electrical outlet therebehind.

In order for an infant or small child to shift one of the doors 40 from the blocking position A to the open position B, the infant or small child preferably may have to perform a complex set of tasks including bilateral hand use and high level fine motor skills, as discussed above, along with motor planning and visual perceptual skills, that are beyond the typical skills for the infant or small child. Mature and refined bilateral hand use may include effective use of two hands working together. The infant or small child would also likely need advanced motor planning skills in order to sequence the proper steps necessary to both unlock the locking mechanism and shift a door 40 to an open position B. In essence, by the time the infant or small child has combined all the skills necessary to perform the two motions for moving the door 40 from the blocking position A to the open position B, they would likely have the cognitive skills to understand the consequences of inserting foreign objects into a socket of an electrical outlet.

The outlet cover assembly 1 includes a pair of doors 40 sandwiched between a frame 10 comprising a front plate 12 and a backing plate 14, as illustrated in FIG. 2. The frame 10 includes two openings 16 and 18 which are positioned to be aligned with sockets of a typical electrical outlet. The doors 40 are each selectively shiftable between a blocking position A, wherein the openings 16 and 18 are blocked and access to the sockets therebehind is substantially prevented, and an open position B, wherein the sockets are accessible through the openings 16 and 18, are as illustrated in FIG. 1.

Each of the doors 40 comprises a blocking portion 41 that is positionable to substantially prevent access to the socket behind the openings 16 and 18 when the doors 40 are in the blocking positions A. An arm 42 is attached at one end to the blocking portion 41 of each of the doors 40. The opposite end of the arm 42 has a locking element 46 formed thereon. The locking element 46 cooperates with a locking feature 32 to substantially prevent movement of the door from the blocking position when the locking element 46 and the locking feature 32 are engaged.

The locking feature 32 is preferably an aperture formed in the front panel 12 of the frame 10. The locking element 46 is preferably a wedge positioned on the arm 42. An end wall 46a of the wedge 46 is positioned to engage a bottom wall 32a of the portion of the front panel 12 surrounding the aperture 32 to substantially prevent relative movement therebetween when the door 40 is in the blocking position A, thereby substantially preventing shifting of the door 40 from the blocking position A to the open position B.

The arm 42 has a thinner portion 42b and a thicker portion 42a, as illustrated in FIG. 3. The thinner portion 42a of the arm 42 is positioned proximate the wedge 46 in order to allow the wedge 46 to be depressed, and the thinner portion 42a of the arm 42 to flex in the direction of depression, to disengage the end wall 46a of the wedge 46 from the bottom wall 32a of the portion of the front panel 12 surrounding the aperture 32. The thicker portion 42b of the arm is sandwiched between the front and backing panels 12 and 14 of the frame 10 with spacing selected to generally prevent unintentional disengagement of the wedge 46 with the portion of the front panel 12 surrounding the aperture 32. Thus, by depressing the wedge element 46 of the arm 42, the door 40 is no longer prevented from shifting from the blocking position A to the open position B.

To this end, the aperture 32 of the front panel 12 may be sized to accommodate a male prong of a typical electrical cord. The profile of the wedge 46 is preferably selected so as not to protrude beyond a front surface of the front panel 12, thereby requiring reaching into the aperture 32 in order to depress the wedge 46 and flex the thinner portion 42a of the arm 42. The direction of the motion to depress the thinner portion 42a of the arm 42 is preferably a shifting motion perpendicular to the front-facing planar surfaces of the frame 10.

Attached to the arm 42 between the one end of the arm 42 and the locking element 46 is a translation element 48 for moving the door 40, once the wedge 46 has been depressed a sufficient amount to disengage the end wall 46a from engagement with the bottom wall 32a of the frame 10, from the blocking position A to the open position B. The translation element 48 is formed on the thicker portion 42b of the arm 42 such that when the translation element 48 is depressed the wedge end wall 46a remains in locking engagement with the wall 32a of the front plate 12 of the frame 10.

The translation element 42 is preferably a knob that slides in a slot 34 formed in the front plate 12 of the frame 10, as illustrated in FIG. 3. Engagement of the knob 42 with the ends of the slot 34 provides a limit of the degree of movement of the door 40 in the open and blocking positions B and A. The direction of the motion required to move the door 40 from the blocking position A to the open position B is preferably a translation motion parallel to the front-facing planar surfaces of the frame 10.

The doors 40 are each biased toward their blocking positions A to ensure that the doors 40 are not inadvertently left in the open positions B. To this end, a spring 58 is connected between the frame 10 and each of the the doors 40. The spring 58 has one, end attached to a hook 44 formed on the door 40 and another end attached to a hook 22 formed on the backing plate 14 of the frame 10 to bias the door 40 to its blocking position B. The wedge 46 preferably has a ramp portion 46b adapted to cause the thinner portion 42a of the arm 42 to flex as the spring member 58 urges the door 40 to the blocking position A to enable the end wall 46a of the wedge 46 to engage with the portion 32a of the frame 12 surrounding the aperture 32.

When one of the doors 40 is in the open position B, a male end of a typical electrical cord may be inserted through the opening 16 or 18 and plugged into the socket of the electrical outlet therebehind. While the male end is plugged into the socket, the male end prevents the spring 58 from biasing the door 40 to the blocking position A. However, once the make end is removed from the socket, the spring 58 biases the door 40 to the blocking position A to ensure that access to the socket is not unintentionally permitted.

Turning to more of the details of the construction of the outlet cover assembly 1, the doors 40 are sandwiched between the front and backing plates 12 and 14 of the frame 10. The backing plate 14 may have holes 24 provided for engagement with posts (not shown) formed on an adjacent side of the front plate 12. In this manner, the front and backing plates 12 and 14 may be held together. For example, a friction fit between the holes 24 and the posts may secure the plates 12 and 14 together, although other securement mechanisms may be equally suitable.

The front plate 12 has an outwardly facing side and a side facing toward the backing plate 14. The side facing toward the backing plate 14 is preferably recessed to accommodate the doors 40 and the springs 58. The backing plate 14 has a side facing the front plate 14, along with a side facing the electrical socket. Aligned screw holes 26 and 28 are provided in both the front and backing plates 12 and 14 to permit the outlet cover assembly 1 to be attached to a typical electrical outlet. For example, the face plate commonly provided over the typical electrical outlet may be removed and replaced with the outlet cover assembly 1. Alternatively, the side of the backing plate 14 facing the electrical outlet may be partially recessed in order to fit over a face plate commonly provided over the typical electrical outlet.

In order to maintain the door 40 in proper alignment as it is shifted between the open and blocking positions B and A, a ridge 54 is provided on the arm 42, as illustrated in FIG. 3. The ridge 54 is positioned to slide within a groove (not shown) formed on the side of the front plate 12 facing the backing plate 14.

In order to minimize the size of the outlet cover assembly 1, an upper end 52 of the door 40 may be arcuately shaped in order to generally nest within the arcuate profile of the upper end 52 of the front plate 12 when the door 40 is in the open position B.

As can be appreciated from the above description of FIGS. 1–3, there is provided a new improved outlet cover assembly for substantially preventing access to a socket of an electrical outlet by an infant or small child. While there have been illustrated and described particular embodiments, it will be appreciated that numerous changes and modifications will occur to those skilled in the art, and it is intended in the appended claims to cover all those changes and modifications which fall within the true spirit and scope thereof.

The invention claimed is:

1. A cover for a socket of an electrical outlet, the cover comprising:
   a substantially planar frame having an opening generally aligned with the socket of the electrical outlet;
   a door shiftable between a blocking position generally blocking access to the opening and an open position generally permitting access to the opening;
   a locking mechanism operable connected to the door, the locking mechanism movable between a locking position substantially preventing shifting of the door from the blocking position to the open position and an unlocking position permitting shifting of the door from the blocking position to the open position;
   an actuator element of the locking mechanism movable in a shifting direction for movement of the locking mechanism from the locking position to the unlocking position, the shifting direction being generally perpendicular to the plane of the frame, the actuator element of the locking mechanism having a locking element engagable with a locking feature of the frame, whereby when the locking element engages the locking feature of the frame shifting of the door from the locking position to the unlocking position is substantially prevented, the locking element being biased into engagement with the locking feature by a biasing element, the biasing element having an arm with an end attached to the door and another end having the locking element attached thereto; and
   a translation element of the locking mechanism movable in a translation direction for shifting of the door from the blocking position to the unblocking position, the translation direction being generally parallel to the plane of the frame.

2. A cover for a socket of an electrical outlet in accordance with claim 1, wherein the arm is integrally formed with the door and the locking element is integrally formed with the arm.

3. A cover for a socket of an electrical outlet in accordance with claim 2, wherein the locking feature comprises an aperture formed in the frame.

4. A cover for a socket of an electrical outlet in accordance with claim 3, wherein a spring member biases the door toward the blocking position.

5. A cover for a socket of an electrical outlet in accordance with claim 4, wherein the spring member has a portion attached to the door and another portion attached to the frame.

6. A cover for a socket of an electrical outlet in accordance with claim 5, wherein the frame includes side facing away from the electrical outlet and a side facing toward the electrical outer, the frame having a slot positioned between the sides, the translation element accessible through the slot and movable in the translation direction to shift the door between the blocking position and the unblocking position.

7. A cover for a socket of an electrical outlet in accordance with claim 6, wherein the translation element is attached to the arm.

8. A cover for a socket of an electrical outlet in accordance with claim 7, wherein the frame comprises an outer plate facing away from the electrical outlet and a backing plate positionable facing the electrical outlet, the door being positioned between the outer plate and the backing plate, the arm having a thicker region proximate the translation element to substantially prevent movement of the translation element in the shifting direction and a thinner region proximate the locking element to permit movement of the locking element in the shifting direction.

9. A cover for a socket of an electrical outlet in accordance with claim 8, wherein the frame includes two openings and a separated door is provided for each opening.

10. A cover for a socket of an electrical outlet, the cover comprising:
   a frame having an opening positioned to be alignable with the socket of the electrical outlet;
   a door shiftable between a blocking position generally blocking access to the opening and an open position generally permitting access to the opening; and
   a locking mechanism operable connected to the door, the locking mechanism movable between a locking position substantially preventing shifting of the door from the blocking position to the open position and an unlocking position permitting shifting of the door from the blocking position to the open position, the movement of the locking mechanism from the locking position to the unlocking position requiring disengagement of a locking element of the locking mechanism from a locking feature while generally simultaneously requiring translation of a translation element operably connected to the door to shift the door from the blocking position to an unblocking position, the translation element accessible via an opening separate from the opening positioned to be alignable with the socket of the electrical outlet.

11. A cover for a socket of an electrical outlet in accordance with claim 10, wherein a spring member is operably connected to the frame and the door to bias the door to the blocking position.

12. A cover for a socket of an electrical outlet in accordance with claim 10, wherein the frame includes two openings and a separate door is provided for each opening.

13. A cover for a socket of an electrical outlet in accordances with claim 10, wherein a door member is provided comprising the door and the locking element.

14. A cover for a socket of an electrical outlet in accordance with claim 13, wherein the door member further comprises the translation element.

15. A cover for a socket of an electrical outlet, the cover comprising:
   a substantially planar frame having at least one opening generally aligned with the socket of the electrical outlet;
   at least one door shiftable between a blocking position generally blocking access to the opening and an open position generally permitting access to the opening;
   locking means integral with the door and movable between a locking position substantially preventing shifting of the door from the blocking position to the open position and an unlocking position permitting shifting of the door from the blocking position to the open position.
   actuator means movable in a shifting direction to move the locking means from the locking position to the unlocking position; and
   translation means movable in a translation direction to shift the door from the blocking position to the unblocking position, translation means including a translation element accessible via an opening in the frame separate from the opening generally aligned with the socket.

* * * * *